(12) United States Patent
Viering et al.

(10) Patent No.: US 10,165,504 B2
(45) Date of Patent: Dec. 25, 2018

(54) DISTRIBUTED IMPLEMENTATION OF SELF-ORGANIZING TRACKING AREAS

(71) Applicant: NOKIA SOLUTIONS AND NETWORKS OY, Espoo (FI)

(72) Inventors: Ingo Viering, Munich (DE); Devaki Chandramouli, Plano, TX (US); Lei Du, Beijing (CN); Yang Liu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/325,897

(22) PCT Filed: Jul. 15, 2014

(86) PCT No.: PCT/US2014/046712
§ 371 (c)(1),
(2) Date: Jan. 12, 2017

(87) PCT Pub. No.: WO2016/010523
PCT Pub. Date: Jan. 21, 2016

(65) Prior Publication Data
US 2017/0171801 A1 Jun. 15, 2017

(51) Int. Cl.
*H04W 48/16* (2009.01)
*H04W 8/02* (2009.01)
(Continued)

(52) U.S. Cl.
CPC ............ *H04W 48/16* (2013.01); *H04W 8/02* (2013.01); *H04W 24/02* (2013.01); *H04W 60/00* (2013.01); *H04W 68/02* (2013.01); *H04W 88/08* (2013.01)

(58) Field of Classification Search
CPC ... H04W 48/16; H04W 68/02; H04W 68/025; H04W 8/02; H04W 88/02; H04W 24/02
(Continued)

(56) References Cited

U.S. PATENT DOCUMENTS 6,363,255 B1 * 3/2002 Kuwahara ............ H04W 60/04
455/435.1
2004/0268351 A1 * 12/2004 Mogensen ............ H04L 47/14
718/100
(Continued)

FOREIGN PATENT DOCUMENTS

EP 1838122 * 9/2007 ............... H04Q 7/38
EP 1838122 A1 9/2007
(Continued)

OTHER PUBLICATIONS

3GPP TS 24.301 V12.4.0 (Mar. 2014); 3rd Generation Partnership Project; Technical Specification Group Core Network and Terminals; Non-Access-Stratum (NAS) protocol for Evolved Packet System (EPS); Stage 3 (Release 12), 362 pages.
(Continued)

*Primary Examiner* — Inder P Mehra
(74) *Attorney, Agent, or Firm* — Brake Hughes Bellermann LLP

(57) ABSTRACT

An example technique may include determining, by a first base station in a wireless network, a user device has transitioned from an active state to an idle state, determining, by the first base station, a list of base stations and a list of cells corresponding to the list of base stations representing a tracking area for the user device based on a signal received from at least one second base station, the signal received from the at least one second base station including an indication of an amount of activity on at least one boundary between the at least one second base station and a plurality of third base stations, and controlling sending, from the first
(Continued)

base station to the user device, a signal including at least one of the list of base stations and the list of cells as a tracking area for the user device.

19 Claims, 11 Drawing Sheets

(51) Int. Cl.
*H04W 60/00* (2009.01)
*H04W 24/02* (2009.01)
*H04W 68/02* (2009.01)
*H04W 88/08* (2009.01)

(58) Field of Classification Search
USPC ...... 455/434, 432.3, 435.2, 435.3, 455, 515, 455/458, 403, 410, 411; 340/7.63; 235/472.02
See application file for complete search history.

(56) References Cited

U.S. PATENT DOCUMENTS

| | | | |
|---|---|---|---|
| 2010/0081454 A1* | 4/2010 | Wang | H04W 68/02 455/456.1 |
| 2011/0098051 A1 | 4/2011 | Kamalaraj et al. | |
| 2014/0113666 A1* | 4/2014 | Arvidsson | H04W 68/00 455/458 |
| 2017/0048732 A1* | 2/2017 | Shekalim | H04B 17/14 |
| 2018/0015329 A1* | 1/2018 | Burich | G06F 19/3418 |

FOREIGN PATENT DOCUMENTS

| | | |
|---|---|---|
| EP | 2129141 A1 | 12/2009 |
| EP | 2320694 A1 | 5/2011 |
| KR | 1020090126282 A | 12/2009 |
| KR | 1020130141915 A | 12/2013 |
| WO | 2016010523 A1 | 1/2016 |

OTHER PUBLICATIONS

3GPP TS 23.122 V12.4.0 (Mar. 2014); 3rd Generation Partnership Project; Technical Specification Group Core Network and Terminals; Non-Access-Stratum (NAS) functions related to Mobile Station (MS) in idle mode (Release 12), 45 pages.

3GPP TS 23.401 V12.4.0 (Mar. 2014), 3rd Generation Partnership Project; Technical Specification Group Services and System Aspects; General Packet Radio Service (GPRS) enhancements for Evolved Universal Terrestrial Radio Access Network (E-UTRAN) access (Release 12), 302 pages.

PCT/US2014/046712, "International Search Report and Written Opinion Received", dated Mar. 11, 2015, 13 pages.

PCT/US2014/046712 , "International Preliminary Report on Patentability", dated Jan. 26, 2017, 10 pages.

Office Action for Korean Application 10-2017-7004131, dated Dec. 18, 2017, 6 pages.

* cited by examiner

DISTRIBUTED IMPLEMENTATION OF SELF-ORGANIZING TRACKING AREAS

This application is a national stage entry of PCT Application No. PCT/EP2014/046712, filed Jul. 15, 2014, entitled "DISTRIBUTED IMPLEMENTATION OF SELF-ORGANIZING TRACKING AREAS" which is hereby incorporated by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as user equipments (UE). LTE has included a number of improvements or developments. In the future, 5G is expected to improve the bandwidth, reduce latency significantly.

SUMMARY

According to an example implementation, a method may include determining, by a first base station in a wireless network, a user device has transitioned from an active state to an idle state, determining, by the first base station, a list of base stations and a list of cells corresponding to the list of base stations representing a tracking area for the user device based on a signal received from at least one second base station, the signal received from the at least one second base station including an indication of an amount of activity on at least one boundary between the at least one second base station and a plurality of third base stations, and controlling sending, from the first base station to the user device, a signal including at least one of the list of base stations and the list of cells as a tracking area for the user device.

According to another example implementation, an apparatus includes at least one processor and at least one memory including computer instructions, when executed by the at least one processor, cause the apparatus to: determine a user device in a wireless network has transitioned from an active state to an idle state, determine a list of base stations and a list of cells corresponding to the list of base stations representing a tracking area for the user device based on a signal received from at least one base station, the signal received from the at least one base station including an indication of an amount of activity on at least one boundary between at the at least one second base station and a plurality of other base stations, and control sending, to the user device, a signal including at least one of the list of base stations and the list of cells as a tracking area for the user device.

According to another example implementation, a computer program product includes a computer-readable storage medium and storing executable code that, when executed by at least one data processing apparatus, is configured to cause the at least one data processing apparatus to perform a method including: determine a user device in a wireless network has transitioned from an active state to an idle state, determine a list of base stations and a list of cells corresponding to the list of base stations representing a tracking area for the user device based on a signal received from at least one base station, the signal received from the at least one base station including an indication of an amount of activity on at least one boundary between at the at least one second base station and a plurality of other base stations, and control sending, to the user device, a signal including at least one of the list of base stations and the list of cells as a tracking area for the user device.

According to an example implementation, a method may include controlling receiving, at a first base station in a wireless network from a second base station of a plurality of base stations in the wireless network, a signal including a base station boundary list having an indication of an amount of activity associated with a boundary between at least two of the plurality of base stations, determining if the first base station includes a boundary to one of the plurality of base stations with an amount of activity that exceeds a threshold amount of activity in a period of time, and upon determining the first base station includes a boundary to one of the plurality of base stations with an amount of activity that exceeds a threshold amount of activity in a period of time adding an identification of the boundary to the base station boundary list, and controlling sending, by the first base station to at least one of the plurality of stations, the base station boundary list.

According to another example implementation, an apparatus includes at least one processor and at least one memory including computer instructions, when executed by the at least one processor, cause the apparatus to: control receiving of at least one of a list of base stations and a list of cells associated with an idle user device, store at least one of the list of base stations and the list of cells as representative of a tracking area for the idle user device, control receiving of an event configured to trigger a paging of the idle user device, and control sending of a paging signal to each of the base stations in at least one of the list of base stations and the list of cells.

According to another example implementation, a computer program product includes a computer-readable storage medium and storing executable code that, when executed by at least one data processing apparatus, is configured to cause the at least one data processing apparatus to perform a method comprising: control receiving of at least one of a list of base stations and a list of cells associated with an idle user device, store at least one of the list of base stations and the list of cells as representative of a tracking area for the idle user device, control receiving of an event configured to trigger a paging of the idle user device, and control sending of a paging signal to each of the base stations in at least one of the list of base stations and the list of cells.

The details of one or more examples of implementations are set forth in the accompanying drawings and the description below. Other features will be apparent from the description and drawings, and from the claims.

DETAILED DESCRIPTION

Figure 1:
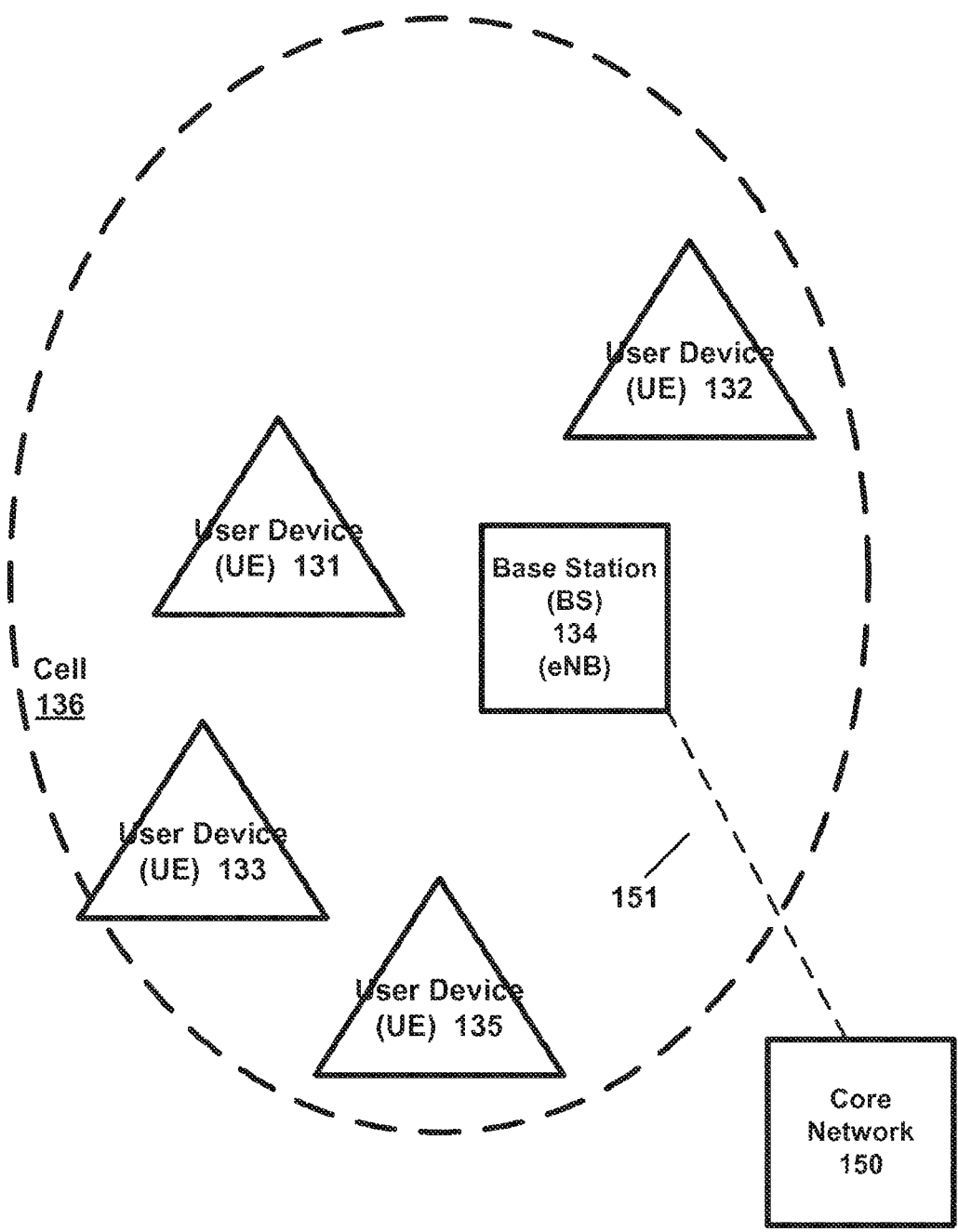
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as user equipments (UEs), may be connected (and in communication) with a base station (BS) 134, which may also be referred to as an enhanced Node B (eNB). At least part of the functionalities of a base station or (e)Node B may be also be carried out by any node, server or host which may be operably coupled to a transceiver, such as a remote radio head. BS 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station, a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

Figure 2:
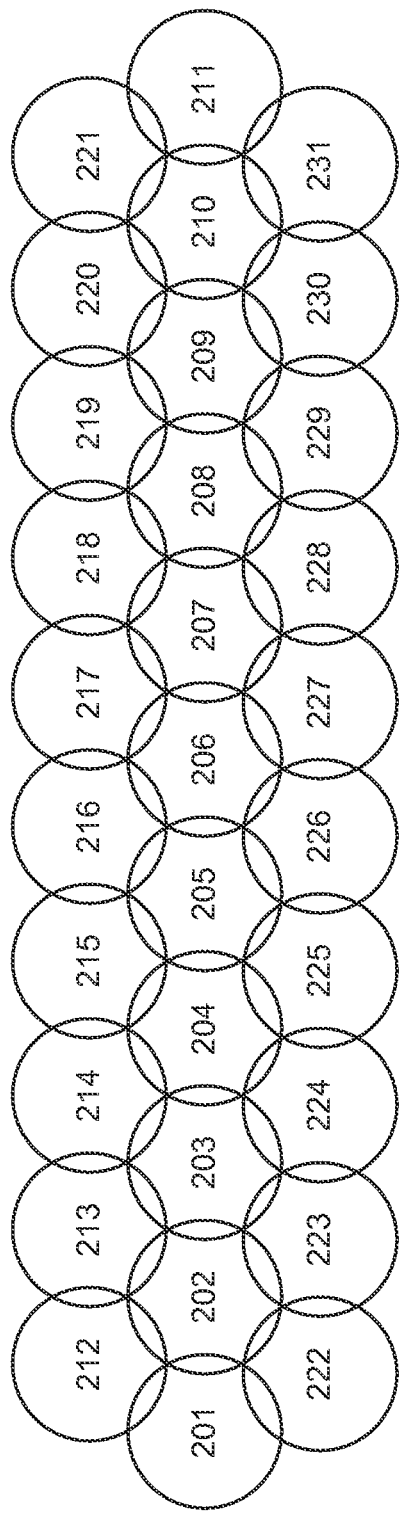
FIG. 2 is a block diagram of a land area including a plurality of wireless networks.

FIG. 2 is a block diagram of a geographic area including a plurality of wireless networks. As shown in FIG. 2, the geographic area 200 can include a plurality of cells 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231. Each of the cells 201 to 231 can be configured a cell (e.g., cell 136) as described above with regard to FIG. 1. A cell 201-231 may have any number of neighbor or adjacent cells. For example, cell 202 is shown as having cells 201, 203, 212, 213, 222, and 223 as neighboring cells. Cells 201 to 231 may or may not overlap (e.g., share a geographic area). For example, cell 201 is shown as overlapping with cells 202, 212, and 212.

A user device (e.g., UE 132) may travel within and/or between one or more of cells 201 to 231. For example, the user device may move around within her home located in cell 214. For example, the user device may travel from cell 201 into cell 202 into cell 203 and so on. If the user device is connected (RRC_CONNECTED), and transitions from cell 201 into cell 202, a handover procedure between cell 201 and cell 202 is performed.

When active user devices are moving from the coverage area of one cell to the coverage area of another cell, a handover procedure takes care that the cell change is hidden to the user of the user devices perception. Unfortunately, such a handover procedure comes along with signaling. In case of mass events where a lot of subscribers are potentially moving into the same direction, this signaling may lead to a severe bottleneck for the system.

On the other hand, to avoid this trouble, as well as to reduce the signaling in general, another cell change procedure has been introduced for inactive users. The network will send inactive user devices into the idle mode (typically after a certain period of inactivity). During this procedure the network can configure a group of cells ("tracking area") in the neighborhood for this user device. As long as the user device moves within this list of tracking areas, it does not have to inform the network. The advantage is that signaling is entirely avoided for cell changes inside the tracking area.

For example, if the user device is idle (RRC_IDLE), and transitions from cell 201 into cell 202 no response by the wireless network may occur or a tracking area update (TAU) may occur. For example, the idle user device may be associated with a tracking area (TA) so that the user device can be found (e.g., in case of an incoming call). If the TA includes both cell 201 and 202, no response by the wireless network may occur.

If the UE moves to a tracking area that is outside the list of TAI(s), the terminal informs the network by performing tracking update. This procedure is typically called "tracking area update" (TAU). For example, if the TA does not include both cell 201 and 202, the user device may signal a TAU so that the wireless network can assign the user device a new TA including cell 202. The drawback of this method is that the network does not know in which exact cell the terminal is camping in but it only knows the current TA. So if the network wants to contact the terminal, it has to typically "page" in every cell of the TA to track the UE.

The more cells the TA includes, the more mobile originated signaling through cell changes (e.g., tracking area update) is avoided. However, another signaling overhead is introduced through unnecessary paging (since the user location is uncertain) in a wider area. According to example embodiments, a TA can be assigned to a user device (e.g., UE 132) in a distributive or distributed (e.g., dynamic or at the base station) manner. In example implementations, a self-organizing TA definition can be implemented in a distributed way (e.g., implemented in base stations (or base station hotels/clouds/BS concentration entities)) using mutually exchanged information about cell boundary activity or cell change activity. The cell boundary activity may indicate busy (e.g., amount of activity exceeds a threshold amount) cell boundaries. The cell boundary activity may be based on a number of handovers, a number of failures, a number of tracking area updates, and/or any other information available in a base station associated with a user device transitioning from one cell to another.

Accordingly, such a solution can be dynamic (e.g., quickly follow changes of the traffic, of the environment, or of the deployment). Furthermore, it could easily create user specific TAs based on any criteria known to the base station (and not known to the MME).

According to example embodiments, each cell (or base station associated with the cell) informs those of its neighbors with a busy boundary (not necessarily each neighbor) about its own busy boundaries and about busy boundaries of its busy-boundary-neighbors, as well as about busy boundaries of the busy-boundary-neighbors of its busy-boundary-neighbors, and so forth. Such an information can be exchanged periodically/regularly, e.g. once a minute, or it can be exchanged on an event bases, e.g. as soon as the information has changed significantly, and/or on a request basis, e.g. if the neighbor asks for an update. This would very quickly propagate the required information for creating idea tracking areas over the neighborhood. Every cell can easily create TAs such that the dominating busy boundaries are inside.

Accordingly, a cell can even add slight changes to the TAs for consecutive terminals to avoid TAUs at the same place. Furthermore, based on its knowledge in busy boundaries, the cell can configure different TAs for different UEs, e.g. depending on the previously visited cells (see the example below), or on the speed, based on the UE category/capabilities, etc.

According to example implementations, "busy boundaries" or cell boundaries with activity that exceeds a threshold amount can be identified by connected mode handover statistics, statistics from TAUs due to cell change and/or statistics from mobility robustness optimization. Adding those statistics, e.g. as one or more counters, would provide the neighborhood with a quantitative notion on how busy those boundaries are, and thus would allow cells to better define the end of a tracking area. For instance, if there are too many busy boundaries, a cell would define the end of the TA by the least busy boundary in a wider area.

Figure 3:
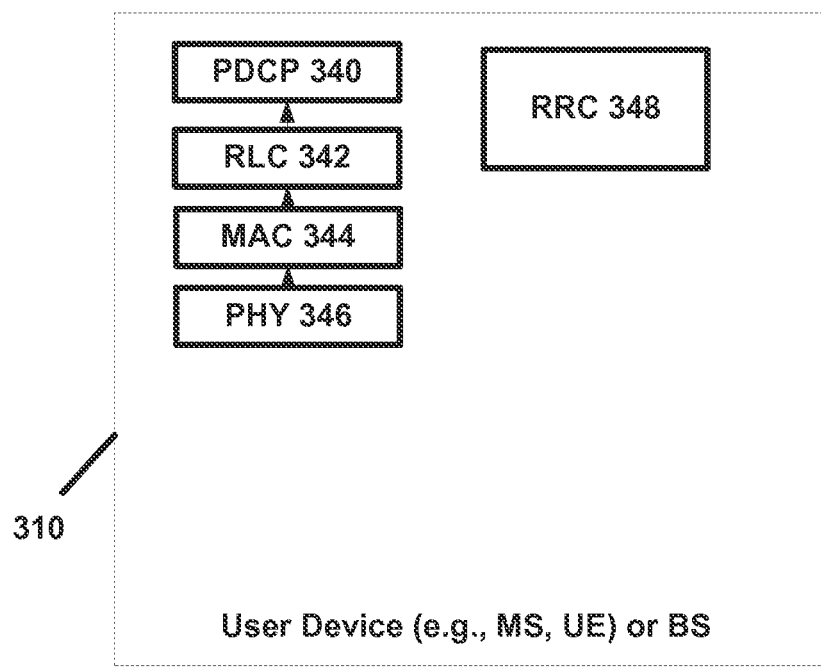
FIG. 3 is a diagram illustrating an example implementation of a user device.

FIG. 3 is a diagram illustrating an example implementation of a user device. Each user device may include at least one radio protocol stack that may be implemented in hardware and/or software. According to an example implementation, a protocol stack may include logic, and/or computer instructions executed by a processor to perform the functions or operations for each entity of the protocol stack. An example protocol stack for a user device 310 may include, for example, a Packet Data Convergence Protocol (PDCP) entity 340, a Radio Link Control (RLC) entity 342, a Media Access Control (MAC) entity 344, a Physical layer (PHY) entity 346, and a Radio Resource Control (RRC) entity 348.

The PDCP entity 340 may, for example, perform ciphering (encryption and decryption of data) and header compression-decompression. The RLC entity 342 may, for example, perform segmentation/concatenation, error detection and correction, data retransmission, duplicate detection and in-sequence data delivery to higher layers. According to an example implementation, there may be one RLC corresponding to one logical channel. MAC entity 344 performs multiplexing of logical channels (where there may be one or more logical channels), hybrid ARQ (HARM) retransmissions (where ARQ may refer to automatic repeat request), inserting of MAC control elements (MAC CEs) used for in-band control signaling, and other MAC-related functions. The PHY entity 346 handles or performs coding/decoding, modulation/demodulation, multi-antenna mapping, and other physical layer functions.

BS 134 may include the same or a similar structure to that shown in FIG. 3, e.g., including one or more of a Packet Data Convergence Protocol (PDCP) entity 340, a Radio Link Control (RLC) entity 342, a Media Access Control (MAC) entity 344, a Physical layer (PHY) entity 346, and a Radio Resource Control (RRC) entity 348.

RRC entity 348 may be responsible for handling a number of functions or procedures related to the Radio Access Network (RAN). For example, RRC entity 348 may be responsible for controlling the sending of paging signals from BS 134 to UE 132. Paging signals may be used, for example, to inform UE 132 of an incoming call when UE 132 is in an idle mode (e.g., RRC_IDLE). Typically, when UE 132 is in an idle mode, the location of UE 132 the location of UE 132 is not known. In other words, a wireless network (e.g., wireless network 130) does not know which cell (e.g., cell 136) a user device (e.g., UE 132) is located in when the user device is in the idle mode.

Accordingly, a mobility management entity (MM or MME) associated with the core network (e.g., core network 150) typically maintains a number of tracking areas (TA) each with an associated tracking area identity (TAI). The MME then associates the idle user device with a last known TAI and list of TAIs (which is stored in both the user device and the MME). The TA (or list of TA's) are typically centrally planned (e.g., static or inflexible) resulting in assignments of a TA that does not consider current cell (e.g., load) or user device conditions (e.g., speed of travel).

According to one example embodiment, the MME maintains (e.g., stores) an anchor cell or BS (e.g., the last BS the user device was connected (RRC_CONNECTED) to) instead of a TA or TAI for the user device. According to another example embodiment the MME maintains (e.g., stores) a list of base stations and/or cell list representing a TA for the user device. The list of base stations may be generated by the anchor BS and communicated to the MME. Accordingly, the list of base stations representing the TA can be dynamic based on current cell and/or user device conditions. In either example embodiment the user device and/or the anchor BS may also store the list of base stations representing the TA. As a result, a TA associated with a user device (e.g., UE 132) can be assigned in a distributive or distributed (e.g., dynamic or at the base station) manner.

In a first example implementation, a mobility management (MM) entity in the network is not aware of the tracking areas at all. The MM considers the terminal still to be associated with the last serving cell (either as a serving cell, or as the anchor cell for the idle mode). Hence, the MM entity will send the paging information to this last serving cell which is aware of the tracking area (e.g., the set of cells where the terminal might be located). The cell would forward this paging information to cells either via indirect interface (e.g. via S1 in LTE), or it would forward this information to those cells to which a direct interface is available (e.g. X2 to the direct neighbors), along with the instruction to forward it to the remaining cells, or a combination thereof.

Figure 4A:
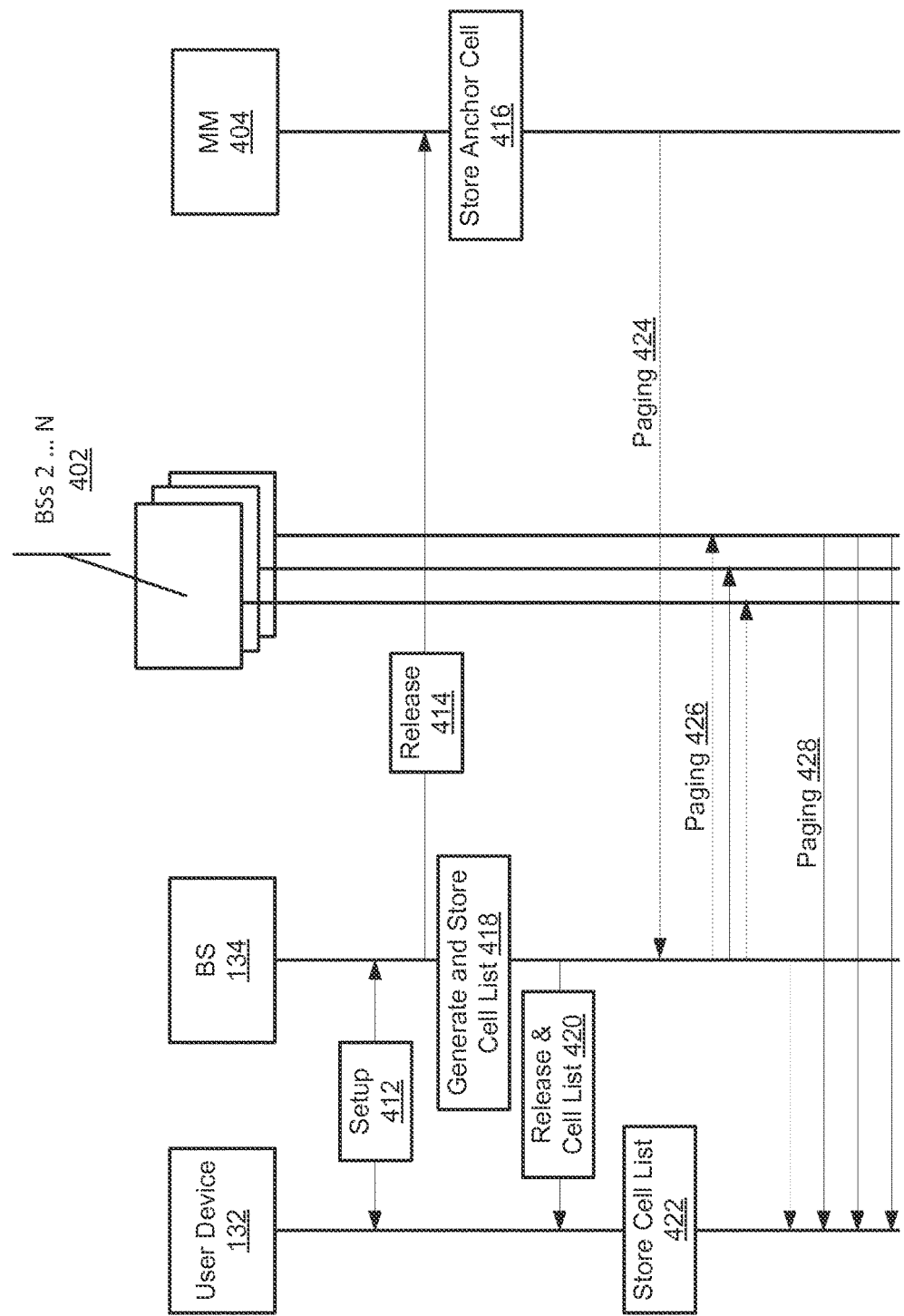
FIG. 4A is a diagram illustrating a technique for assigning a tracking area (TA) to a user device according to an example implementation.

FIG. 4A is a diagram illustrating a technique for assigning a tracking area (TA) to a user device according to an example implementation. As shown in FIG. 4A, signals/paging signals/messages are communicated between one or more of a user device (UE) 132, a base station (BS) 134, a plurality of base stations (BSs) 402, and a mobility management entity (MM) 404. The MM 404 may be an element of a core network (e.g., core network 150). The description below describes the communication of signals. This communication of signals may be described as controlling the sending of a signal (or paging signal or message) by a controller (e.g., RRC 348) by a first device (e.g., UE 132) to a second device (e.g., BS 134). The second device then controls the receiving of the signal (or paging signal or message) by a controller (e.g., RRC 348) of the second device.

As shown in FIG. 4A a signal 412 is communicated between the UE 132 and the BS 134. The signal 412 may be associated with a connection setup, or a transition from an idle mode to a connected mode of the UE 132. In one example implementation, the signal 412 may be triggered based on a TAU. In another example implementation, signal 412 can be triggered based on a UE 132 initialization (e.g., power on) procedure. Other implementations where a TA determination may be triggered are within the scope of this disclosure.

The BS 134 then communicates a signal 414 to the MM 404. The signal 414 may be a release signal. A release signal may be a connection release completed. In one example implementation, the signal 414 may be based on an inactivity timer associated with UE 132. A connection release completed may indicate to the MM 404 that the UE 132 has been disconnected from the BS 134. The signal 414 may include the identity of the BS 134. Alternatively (or in addition to), the channel over which the signal is communicated (e.g., the S1 channel) may identify the base station BS 134. Accordingly, MM 404 may store the identity of the BS 134 as the anchor cell for the UE 132 (block 416). In other words, MM 404 may store the identity of the last base station the UE 132 was connected to or attached to as the anchor cell. According to an example embodiment, an anchor cell may be used in place of a TA assignment or TAI assignment for an idle user device.

In parallel (or substantially in parallel) to communicating the signal 414, the BS 134 generates and stores a cell list representing a tracking area (block 418). As discussed in more detail below, the cell list representing a tracking area may be based on information received (e.g., as signals) from other base stations. The information may include busy cell boundaries as determined by each of the other base stations. The cell list may be generated in such a way (e.g., to include) that the UE 132 is prevented from issuing a TAU at busy cell boundaries. The cell list may be stored in a memory associated (e.g., a hard drive or non-volatile local memory) with BS 134.

Then a signal 420 is communicated from the BS 134 to the UE 132. The signal 420 may be a RRC connection release. In one example implementation, the signal 420 may be based on an inactivity timer associated with UE 132. The signal 420 includes the cell list representing a tracking area for the UE 132 while UE 132 is in the idle mode.

At some time in the future, some event necessitating locating UE 132 may occur. For example, a text message, a data download, a phone call, and/or the like directed to the UE 132 may trigger the need to locate UE 132. According to example embodiments, the MM 404 determines the anchor cell or BS for UE 132. For example, the MM 404 may read the anchor from the memory associated with the storing in block 416. The MM 404 then communicates a paging signal 424 to BS 134 as the base station associated with (e.g., serving) the anchor cell. The paging signal 424 may be a S1 application protocol (S1AP) paging message including the identity of UE 132.

Upon receiving the paging signal 424, the BS 134 communicates a paging signal 426 to each of the plurality of BSs 402 in the cell list representing the tracking area for UE 132. The paging signal 426 may be communicated over a modified X1 application protocol (mX1AP) such that each of the plurality of BSs 402 receive the signal (the X1 application protocol typically is configured to communicate with neighboring cell base stations). In one example implementation, the mX1AP includes communicating the paging signal 426 such that it is passed through each BSs 402 until all base stations in the cell list receive the paging signal 426. In another example implementation, the mX1AP includes communicating the paging signal 426 over a wireless communication channel. In still another example implementation, the mX1AP includes communicating the paging signal 426 (with the cell list) to MM 404 which in turn forwards the paging signal 426 to each base station in the cell list.

Upon receiving the paging signal 426, each of the plurality of BSs 402 in the cell list and the BS 134 communicates a paging signal 428 to the UE 132. The paging signal 428 may be communicated over a physical downlink control channel (PDCCH) for each base station (e.g., for each cell). If the UE 132 responds to the paging signal 428, the base station (e.g., one of BSs 402) receiving the response establishes a link to the UE 132 for wireless communications (e.g., a RRC link).

In another example implementation, the cell which sends an active UE to idle by releasing the connection and configuring the UE with the TA will also inform a MM entity about the last known TAI. This implies that the cell notifies TAI information to MME when RRC connection is released. So, when there is a mobile terminating transaction (e.g. incoming call, PS data, SMS or any other event), the MM entity may ensure that the paging information is multi-casted to all cells in the TA.

Figure 4B:
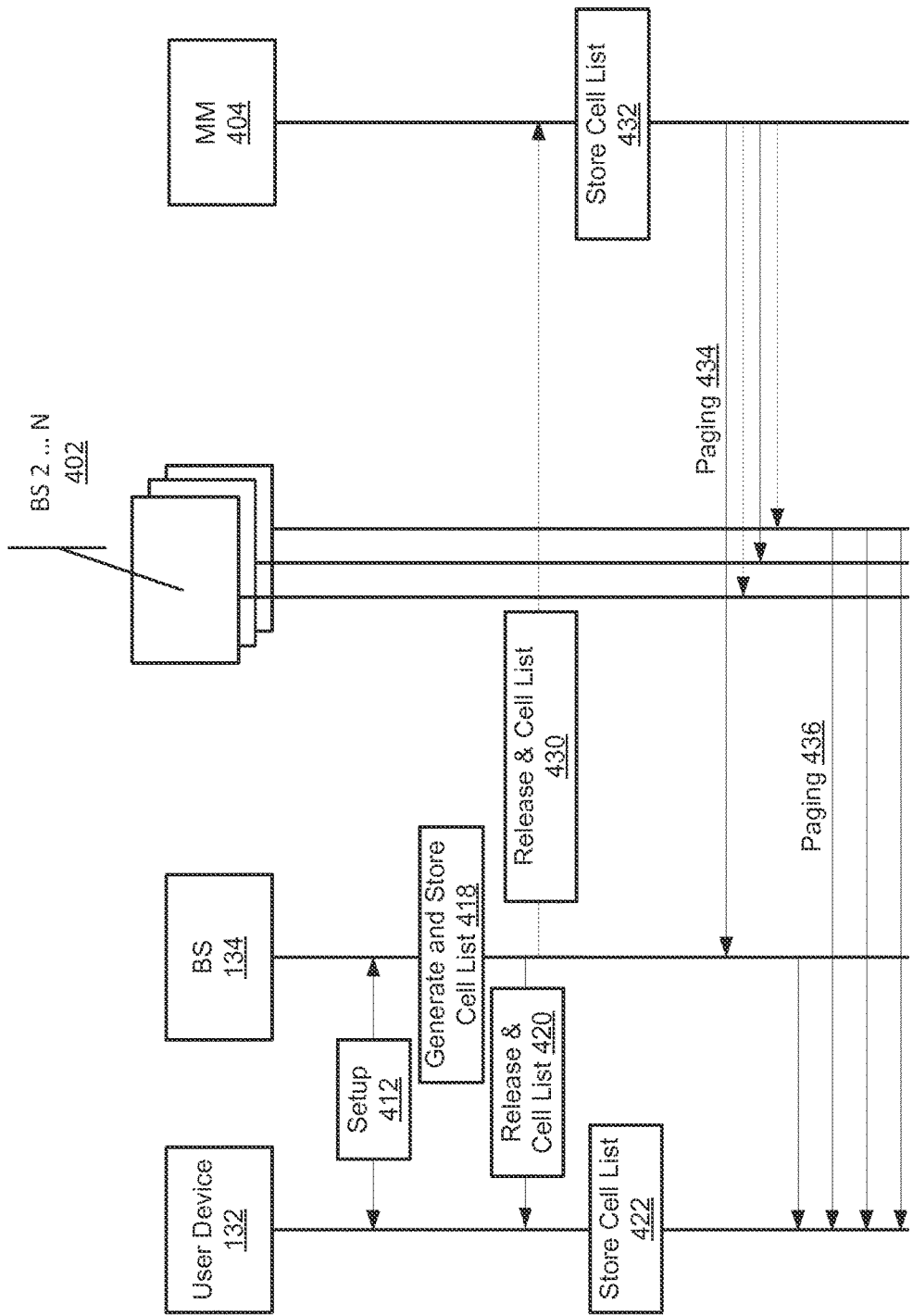
FIG. 4B is a diagram illustrating a technique for assigning a tracking area (TA) to a user device according to another example implementation.

FIG. 4B is a diagram illustrating a technique for assigning a tracking area (TA) to a user device according to another example implementation. As shown in FIG. 4B, blocks/signals 412, 418, 420 and 422 are substantially the same as shown in FIG. 4A and will not be repeated for the sake of brevity. Noting that triggering the generation and storing of the cell list representing a tracking area (block 418) may be based on a TA determination event (e.g., an inactivity timer associated with UE 132 or a TAU).

The BS 134 communicates a signal 430 to the MM 404. The signal 430 may be a release signal. A release signal may be a RRC connection release completed. A RRC connection release completed may indicate to the MM 404 that the UE 132 has been disconnected from the BS 134. The signal 430 may include the identity of the BS 134. Alternatively (or in addition to), the channel over which the signal is communicated (e.g., the S1 channel) may identify the base station BS 134. The signal 430 may also include the cell list representing the TA for UE 132 as generated by BS 134. Accordingly, MM 404 may store the identity of the BS 134 in correspondence with the cell list representing the TA for the UE 132 (block 432). According to an example embodiment, the cell list representing the TA may be used in place of a TA assignment or TAI assignment for an idle user device.

At some time in the future, some event necessitating locating UE 132 may occur. For example, a text message, a data download, a phone call, and/or the like directed to the UE 132 may trigger the need to locate UE 132. According to example embodiments, the MM 404 determines the possible location of the UE 132 using the cell list representing the TA. For example, the MM 404 may read the cell list representing the TA from the memory associated with the storing in block 432. The MM 404 then communicates a paging signal 434 to BS 134 and the BSs 402 included in the cell list representing the TA. The paging signal 434 may be a S1 application protocol (S1AP) paging message including the identity of UE 132.

Upon receiving the paging signal 434, each of the plurality of BSs 402 in the cell list and the BS 134 communicates a paging signal 436 to the UE 132. The paging signal 436 may be communicated over a physical downlink control channel (PDCCH) for each base station (e.g., for each cell). If the UE 132 responds to the paging signal 436, the base station (e.g., one of BSs 402) receiving the response establishes a link to the UE 132 for wireless communications (e.g., a RRC link).

Figure 5:
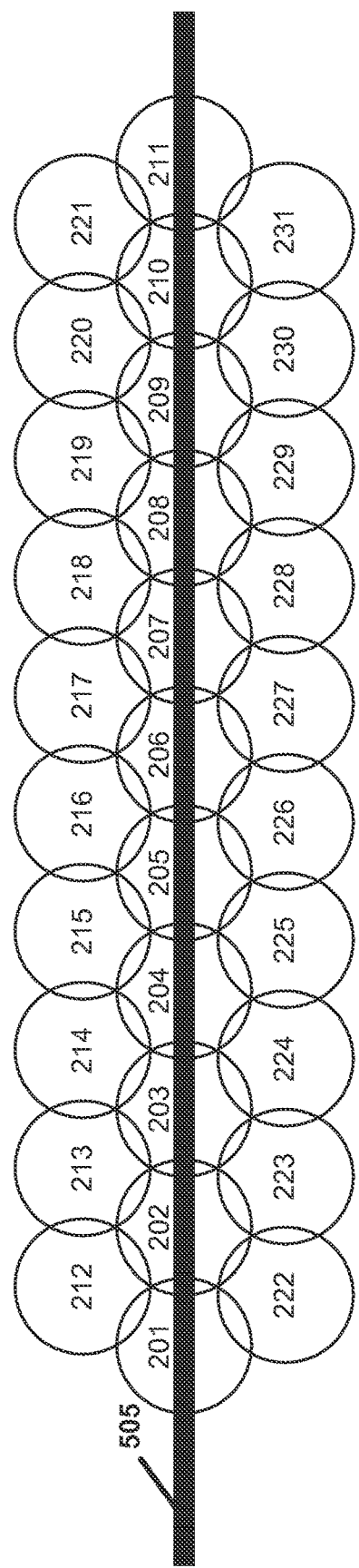
FIG. 5 is a block diagram of a land area including a plurality of wireless networks and a roadway to illustrate a technique for assigning a tracking area (TA) according to at least one example implementation.

FIG. 5 is a block diagram of a land area including a plurality of wireless networks and a roadway to illustrate a technique for assigning a tracking area (TA) according to at least one example implementation. In this example implementation, consider the roadway 505 with high-speed automobiles having user devices within the vehicle covered by a number of cells in a geographic area 200 as described above with regard to FIG. 2. This example implementation may take advantage of the location of the roadway 505 and user device information (e.g. speed of travel, direction of travel, number of user devices, and the like) to define tracking areas including cells which are passed by user devices. FIG. 5 illustrates a simplified 1-dimensional deployment to show how such a TA definition would converge.

Initially every cell 201 to 231 can only identify its own neighbours with a busy boundary. Iteratively, each cell can inform its neighbouring cells with busy boundaries about its own busy boundaries. So in the second step, for example, cell 203 would be aware that cells 201 to 205 are all inter-connected via busy boundaries. The example shows that after 5 iterations cell 206 can configure the full area as tracking area for fast terminals. Table 1 illustrates these iterations.

make the overhead negligible (assuming a huge list of 100 kB transferred once a minute, this would correspond to a data rate of 13 kbps). If tracking areas comprise ~100 cells, the mechanism can react on a significant change of the traffic within 100 minutes.

In this example implementation, a base station would be able to define a tracking area which depends on the direction of the terminal. For example, if an active user device is sent to idle in cell 206 (after iteration 5), the base station associated with cell 206 would define the tracking area as 201 to 206 if the previously visited cells are 209, 208, 207, and the base station associated with cell 206 would define the tracking area as 206 to 211 if the previously visited cells are 202, 203, 204, 205. The direction could be read from the UE context which contains some history already in LTE (e.g. "UE history").

The base station could also take into consideration the speed of the user device. For example, if the user device is travelling fast, the TA could include more cells than if the user device were travelling slow or comparatively slow. Threshold speed values could define speed ranges to associate with a number of cells. For example, a speed between 0 and 30 mph may include 10 cells; a speed between 30 and 40 mph may include 20 cells; a speed between 40 and 50 mph may include 30 cells; and the like.

The base station could also take into consideration the number of user devices on roadway 505. For example, the cell range in a TA could be randomly shifted based on the number user devices on roadway 505. For example, a first user device could be assigned tracking area as 201 to 204; a second user device could be assigned tracking area as 201 to 206; a third user device could be assigned tracking area as 201 to 205; and the like.

Figure 6:
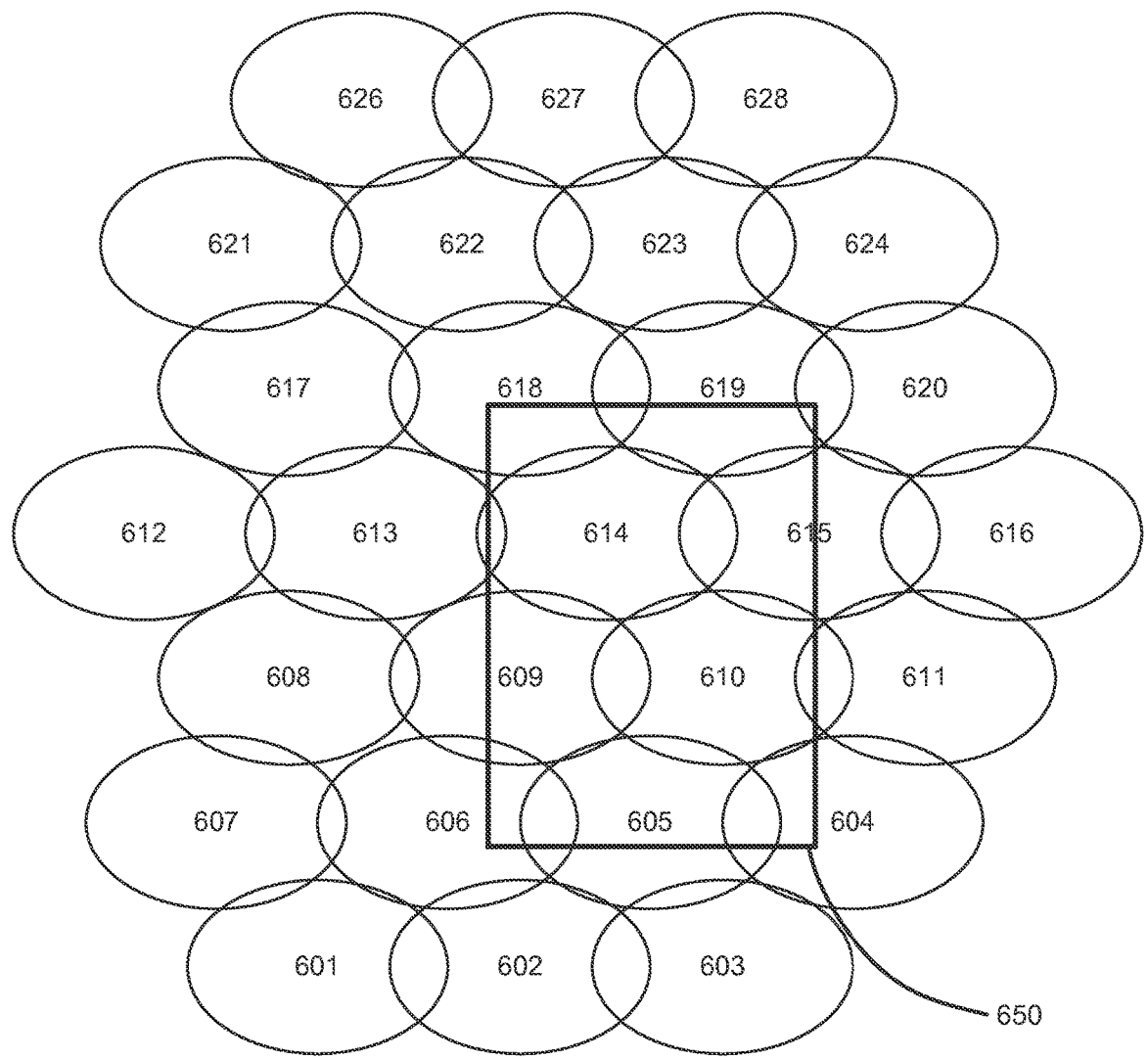
FIG. 6 is a block diagram of another land area including a plurality of wireless networks to illustrate a technique for assigning a tracking area (TA) according to at least one example implementation.

FIG. 6 is a block diagram of another land area including a plurality of wireless networks to illustrate a technique for assigning a tracking area (TA) according to at least one example implementation. As shown in FIG. 6, the geographic area 600 can include a plurality of cells 601, 602, 603, 604, 605, 606, 607, 608, 609, 610, 611, 612, 613, 614, 615, 616, 617, 618, 619, 620, 621, 622, 623, 624, 625, 626, 627, and 628. Each of the cells 601 to 628 can be configured a cell (e.g., cell 136) as described above with regard to FIG. 1. A cell 601 to 628 may have any number of neighbor or adjacent cells. For example, cell 602 is shown as having cells 601, 603, 606, and 605 as neighboring cells. Cells 601 to 631 may or may not overlap (e.g., share a geographic area). For example, cell 601 is shown as overlapping with cells 602, 606, and 607.

TABLE 1

| Iteration | Cell #202 | Cell #203 | Cell #204 | Cell #205 | Cell #206 | Cell #207 | Cell #208 | Cell #209 |
|---|---|---|---|---|---|---|---|---|
| 1 | 201, 203 | 202, 204 | 203, 205 | 204, 206 | 205, 207 | 206, 208 | 207, 209 | 208, 210 |
| 2 | 201, . . . , 204 | 201, . . . , 205 | 202, . . . , 206 | 203, . . . , 207 | 204, . . . , 208 | 205, . . . , 209 | 206, . . . , 210 | 207, . . . , 211 |
| 3 | 201, . . . , 205 | 201, . . . , 206 | 201, . . . , 207 | 202, . . . , 208 | 203, . . . , 209 | 204, . . . , 210 | 205, . . . , 211 | 206, . . . , 211 |
| 4 | 201, . . . , 206 | 201, . . . , 207 | 201, . . . , 208 | 201, . . . , 209 | 202, . . . , 210 | 203, . . . , 211 | 203, . . . , 211 | 205, . . . , 211 |
| 5 | 201, . . . , 207 | 201, . . . , 208 | 201, . . . , 209 | 201, . . . , 210 | 201, . . . , 211 | 202, . . . , 211 | 202, . . . , 211 | 204, . . . , 211 |

An iteration could be given by a regular update procedure, potentially upon request from the neighbour. For example, those updates could happen on a minute basis, which would A user device (e.g., UE 132) may travel within and/or between one or more of cells 601 to 628. For example, the user device may move around within her home located in cell 612. For example, the user device may travel from cell 601 into cell 602 into cell 603 and so on. If the user device is connected (RRC_CONNECTED), and transitions from cell 601 into cell 602, a handover procedure between cell 601 and cell 602 is performed.

If the user device is idle (RRC_IDLE), and transitions from cell 601 into cell 602 no tracking area update (TAU) may occur. For example, the idle user device may be associated with a tracking area (TA) so that the user device can be found (e.g., in case of an incoming call). If the TA includes both cell 601 and 602, no response by the wireless network may occur. If the TA does not include both cell 601 and 602, the user device may signal a TAU so that the wireless network can assign the user device a new TA including cell 602. According to example embodiments, a TA can be assigned to a user device (e.g., UE 132) in a distributed or distributive (e.g., dynamic or at the base station) manner.

In this example implementation a busy area 650 (e.g., many subscribers are moving within the rectangle). As shown in FIG. 6, the busy area 650 covers cells 606, 605, 604, 609, 610, 611, 613, 614, 615, 616, 618, 619, 620. The tracking area for active users getting idle in one of those cells should probably consist of this set. Whether or not a cell should be included in the TA is not fully clear (e.g., should cell 616 be in the set). Further, two user devices going idle could be assigned different (manually configured) TA's. For example a first user device could be assigned a TA list of 605, 604, 606 and a second user device could be assigned 605, 606, 607. In some cases different TA's could overlap. A technician or system administrator (or the like) creating TAs manually would specify the full set to be on the safe side, whereas e.g. cell 616, 604, 606, 611, 613 may never be entered by a user device. Table 2 shows the busy boundaries known to each cell after every iteration. Network planning does not typically have detailed knowledge regarding whether or not a portion of the cells are entered frequently, and the remaining cells are not entered too often. However, example embodiments describe base stations that include this information and can determine/generate/assign a TA accordingly. This results in a distributed and dynamic assignment of a TA to an idle user device.

TABLE 2

| Iteration | Cell 614 | Cell 615 | Cell 609 | Cell 610 | Cell 605 | Cell 618 | Cell 619 | Cell 620 |
|---|---|---|---|---|---|---|---|---|
| 1 | 618, 619, 615, 610, 609 | 614, 619, 620, 610, 611 | 614, 610, 605 | 614, 615, 605, 609 | 609, 610 | 614, 619 | 614, 615, 620 | 615, 619 |
| 2 | 618, 619, 615, 610, 609, 605, 620 | 614, 619, 620, 610, 611, 618, 609 | 614, 610, 605, 618, 619, 615 | 614, 615, 605, 609 | | | | |
| 3 | | | 614, 610, 605, 618, 619, 615, 620 | Etc. | | | | |

In this example implementation, it can be observed that in one iteration a significant portion of the cells are aware of the whole busy area and can therefore configure improved tracking areas. Furthermore, the example TA is smaller than a tracking area which would be statically configured by manual network planning.

In another or additional example implementation, the cell lists could be communicated to a neighbouring cell (e.g., the base station serving a neighbouring cell) in at least one of the following formats.

1. The cell list can be structured with respect to the tier, and the neighbour. For example:
   a. Direct neighbour: cell 1, 2, 3
   b. $2^{nd}$ tier neighbours
      i. Cell 1: 4, 5
      ii. Cell 2: 6, 1
      iii. Cell 3: 7, 8
   c. $3^{rd}$ tier neighbours
      i. Cell 4: . . .
      ii. Cell 5: . . .
      iii. Cell 6: . . .
      iv. Cell 7: . . .
      v. Cell 8: . . .
   d. $4^{th}$ tier neighbours . . .
2. The cell list can be structured only with respect to the tier (not the neighbour). For example:
   a. Direct neighbour: cell 1, 2, 3
   b. $2^{nd}$ tier neighbours: 4, 5, 6, 1, 7, 8
   c. $3^{rd}$ tier neighbours: . . .
3. The cell list could be an unstructured list of cell IDs (with potentially removed duplicates). Note that this approach has been shown in the upper examples for the sake of simplicity. For example:
   a. 1, 2, 3, 4, 5, 6, 7, 8

Figure 7:
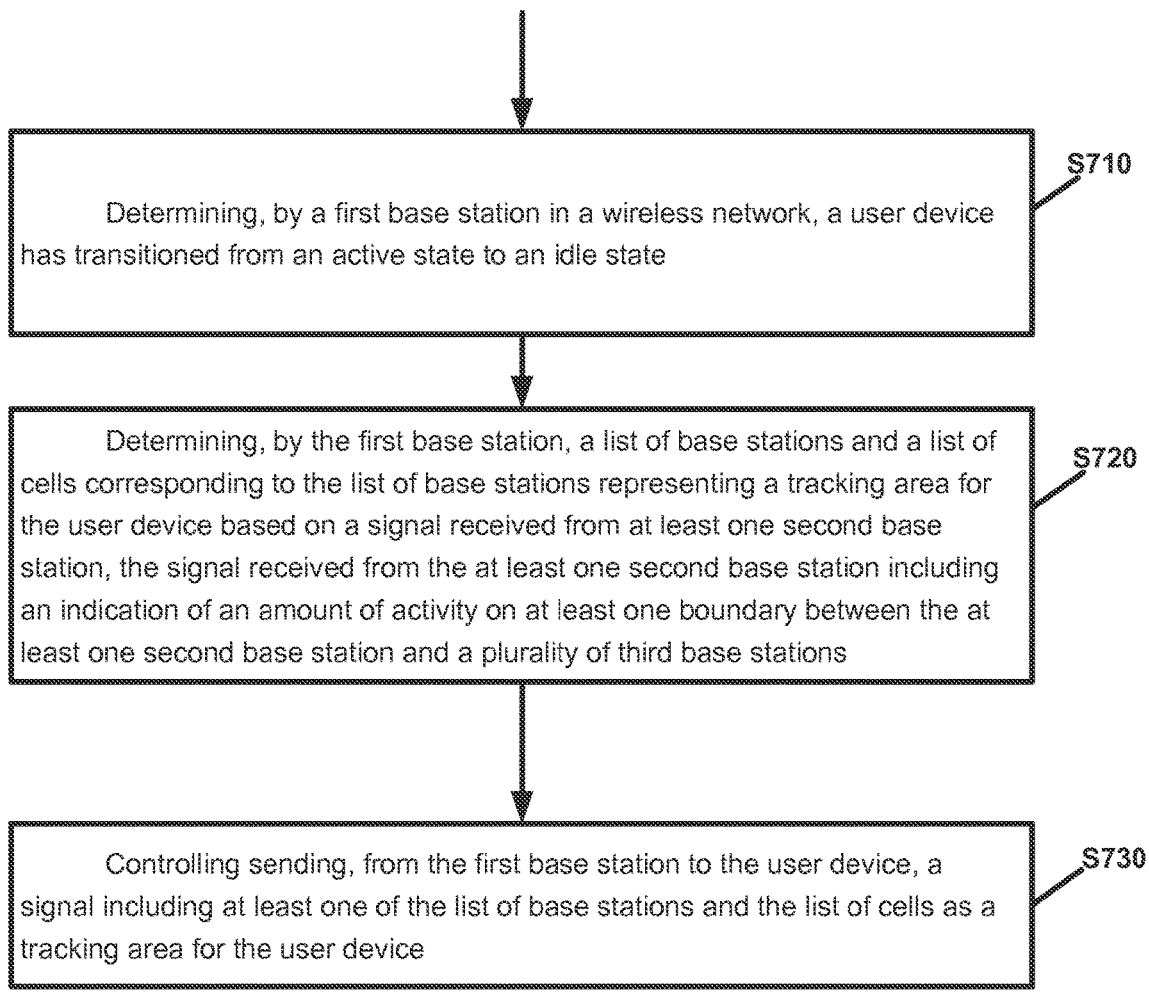
FIG. 7 is a flow chart illustrating operation of a base station according to an example implementation.
Figure 8:
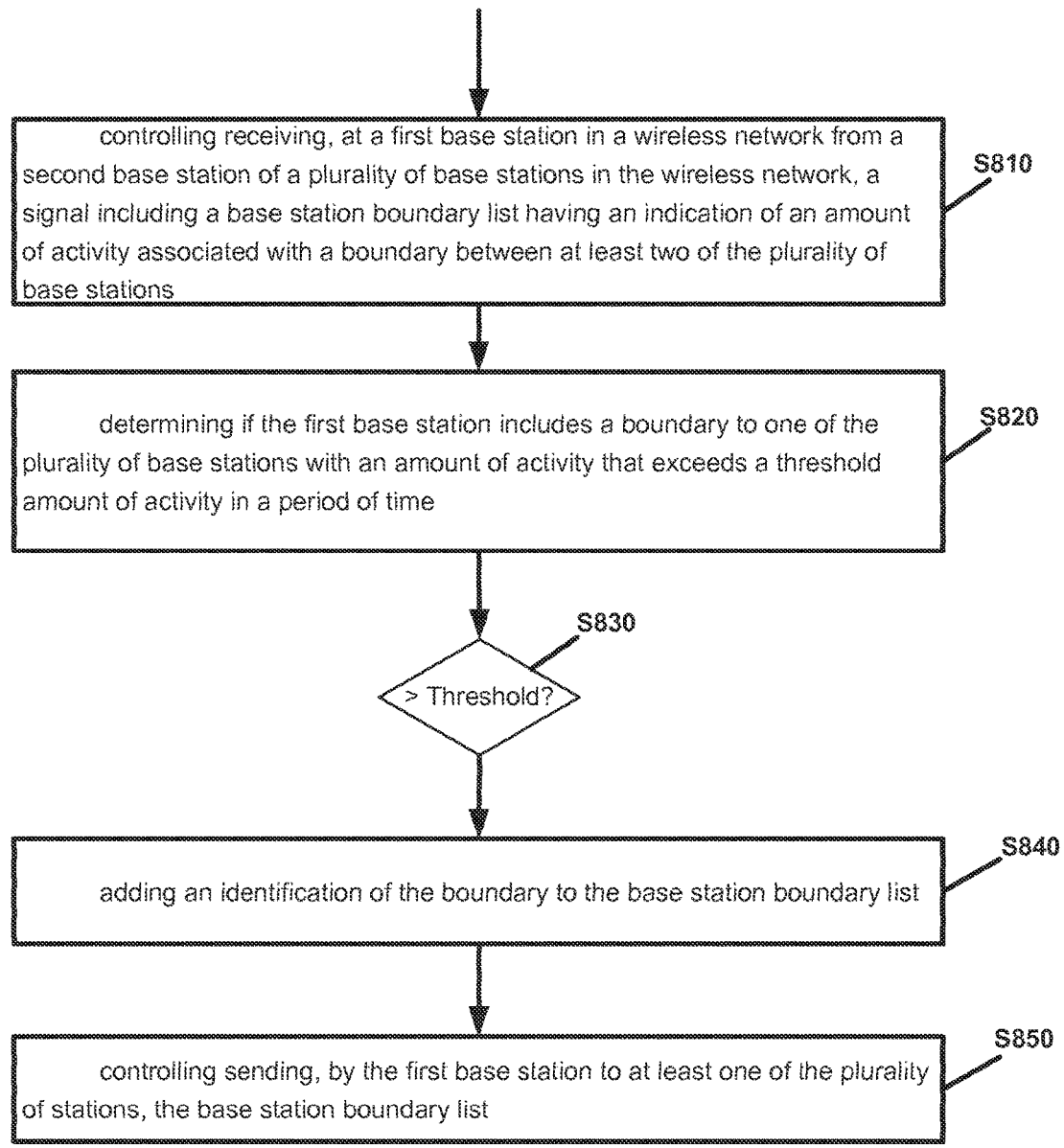
FIG. 8 is a flow chart illustrating operation of a base station according to another example implementation.
Figure 9:
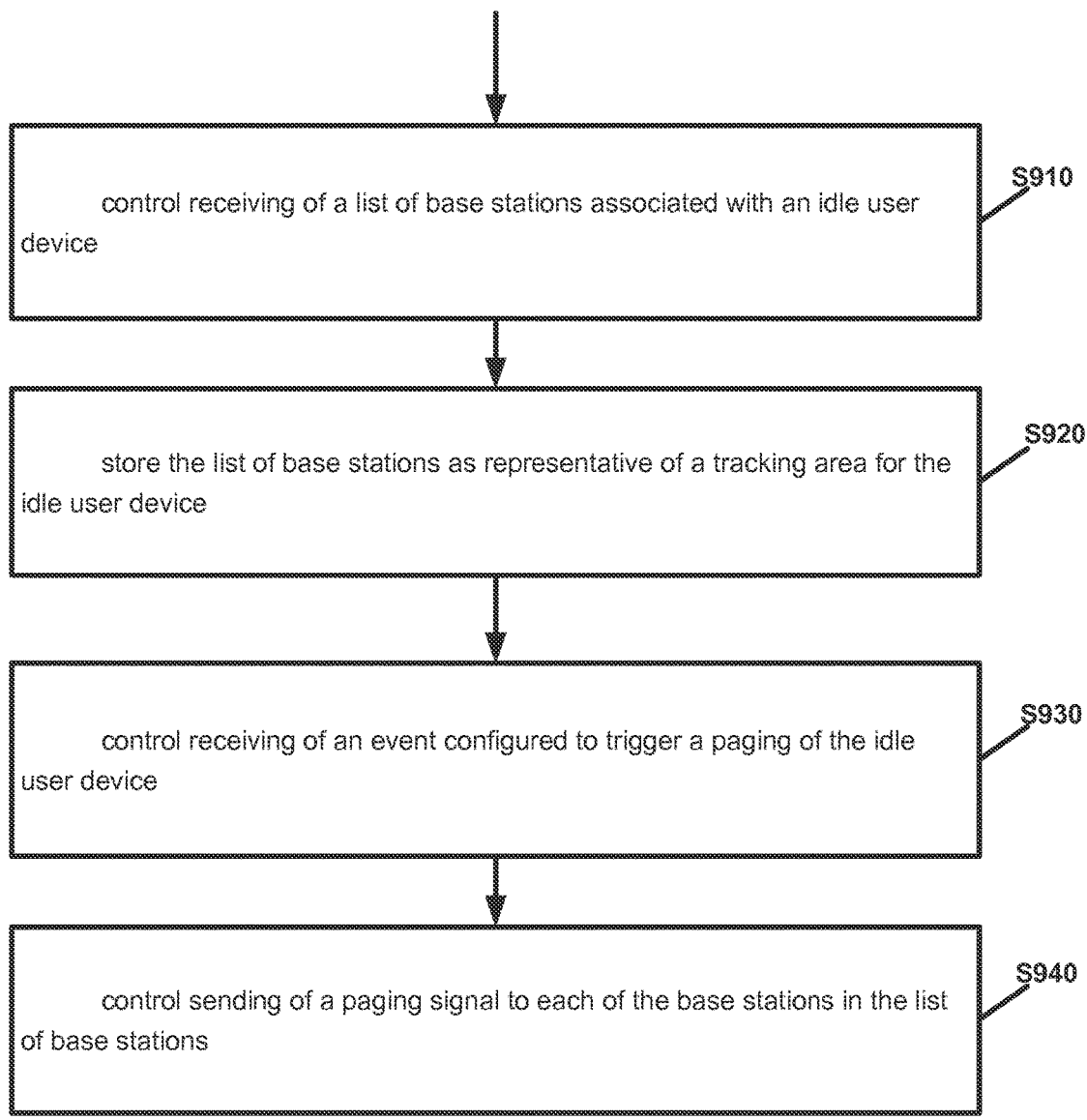
FIG. 9 is a flow chart illustrating operation of a mobility management entity according to another example implementation.

FIGS. 7-9 are flowcharts of methods according to example embodiments. The steps described with regard to FIGS. 7-9 may be performed due to the execution of software code stored in a memory associated with an apparatus and executed by at least one controller or processor associated with the apparatus. However, alternative embodiments are contemplated such as a system embodied as a special purpose processor. Although the steps described below are described as being executed by a controller or processor, the steps are not necessarily executed by a same controller or processor. In other words, at least one processor may execute the steps described below with regard to FIGS. 7-9.

FIG. 7 is a flow chart illustrating operation of a base station according to an example implementation. In step S710 a first base station in a wireless network controls determining a user device has transitioned from an active state to an idle state. The following steps can be triggered based on a user device initialization (e.g., power on) or TAU procedure and/or other implementations where a TA determination may be triggered.

In step S720 the first base station determines a list of base stations (and/or a list of cells) representing a tracking area for the user device based on a signal received from at least one second base station, the signal received from the at least one second base station including an indication of an amount of activity or boundary activity on at least one boundary between the at least one second base station and a plurality of third base stations. The amount of activity or boundary activity can be based on at least one boundary between boundaries of the plurality of third base stations, at least one boundary between boundaries of the plurality of third base stations and/or a combination thereof. In step S730 the first base station controls sending, to the user device, a signal including the list of base stations (and/or a list of cells) as a tracking area for the user device.

According to an example implementation of the method described in FIG. 7, the first base station controls sending, to a mobility management entity, a signal including the list of base stations (and/or a list of cells) as a tracking area for the user device. According to an example implementation of the method described in FIG. 7, the first base station controls receiving, from a mobility management entity, a paging signal for the user device and sending to each base station in the list of base stations (and/or a list of cells), the paging signal for the user device.

According to an example implementation of the method described in FIG. 7, the first base station maintains a list corresponding boundary activity and base station location and controls determining the list of base stations (and/or a list of cells) representing the tracking area for the user device based on the list corresponding boundary activity and base station location. According to an example implementation of the method described in FIG. 7, the first base station controls determining at least one mobility parameter for the user device and controls determining the list of base stations (and/or a list of cells) representing the tracking area for the user device is further based on the mobility parameters for the user device.

According to an example implementation of the method described in FIG. 7, the first base station controls receiving from a first neighboring base station of the at least one second base station, a signal including an indication of an amount of activity (or boundary activity) at the at least one second base station and a plurality of third base stations wherein the indication includes a base station boundary list that indicates activity (or boundary activity) associated with a boundary between two of the plurality of third base stations exceeds a threshold amount of activity in a period of time, controls determining if the first base station includes a boundary to one of the at least one second base station with an amount of activity that exceeds the threshold amount of activity in a period of time, and upon determining the first base station includes a boundary to one of the at least one second base station with a amount of activity that exceeds the threshold amount of activity in a period of time, the first base station controls adding an identification of the boundary to the base station boundary list, and controlling sending, by the first base station to each of the at least one second base station, the base station boundary list.

According to an example implementation of the method described in FIG. 7, the first base station controls receiving from another base station, a paging signal for another user device, controls sending, to the another user device, the paging signal for the another user device and/or controls sending, to yet another base station, the paging signal for the another user device. According to an example implementation of the method described in FIG. 7, the first base station includes carrying out any of the aforementioned steps. According to an example implementation of the method described in FIG. 7, the first base station includes software portions code (e.g., as a software product) for performing the steps of any of aforementioned steps when steps are run on the computer.

FIG. 8 is a flow chart illustrating operation of a base station according to another example implementation. In step S810 a first base station in a wireless network controls receiving, from a second base station of a plurality of base stations in the wireless network, a signal including a base station boundary list having an indication of an amount of activity (or boundary activity) associated with a boundary between at least two of the plurality of base stations. In step S820 the first base station controls determining if the list includes a boundary to one of the plurality of base stations with an amount of activity that exceeds a threshold amount of activity in a period of time. In step S830 upon determining the first base station includes a boundary to one of the plurality of base stations with an amount of activity that exceeds a threshold amount of activity in a period of time, in step S840 adding an identification of the boundary to the base station boundary list and in step S850 controlling sending, by the first base station to at least one of the plurality of stations, the base station boundary list.

According to an example implementation of the method described in FIG. 8, the first base station controls receiving a signal from a user device in the wireless network, the signal indicating the user device has transitioned from an active state to an idle state, controls determining a list of base stations (and/or a list of cells) representing a tracking area for the user device based on the base station boundary list, and controls sending to the user device, a signal including the list of base stations (and/or the list of cells) as a tracking area for the user device. According to an example implementation of the method described in FIG. 8, the first base station controls sending, to a mobility management entity, a signal indicating a release of the user device and including an identification of the first base station as an anchor base station for the user device and controls sending, to the mobility management entity, a signal including the list of base stations (and/or the list of cells) as a tracking area for the user device.

FIG. 9 is a flow chart illustrating operation of a mobility management entity according to another example implementation. In step S910 the apparatus controls receiving of a list of base stations (and/or a list of cells) associated with an idle user device. In step S920 the apparatus stores the list of base stations (and/or the list of cells) as representative of a tracking area for the idle user device. In step S930 the apparatus controls receiving of an event configured to trigger a paging of the idle user device. In step S940 the apparatus controls sending of a paging signal to each of the base stations in the list of base stations (and/or corresponding to the list of cells).

Figure 10:
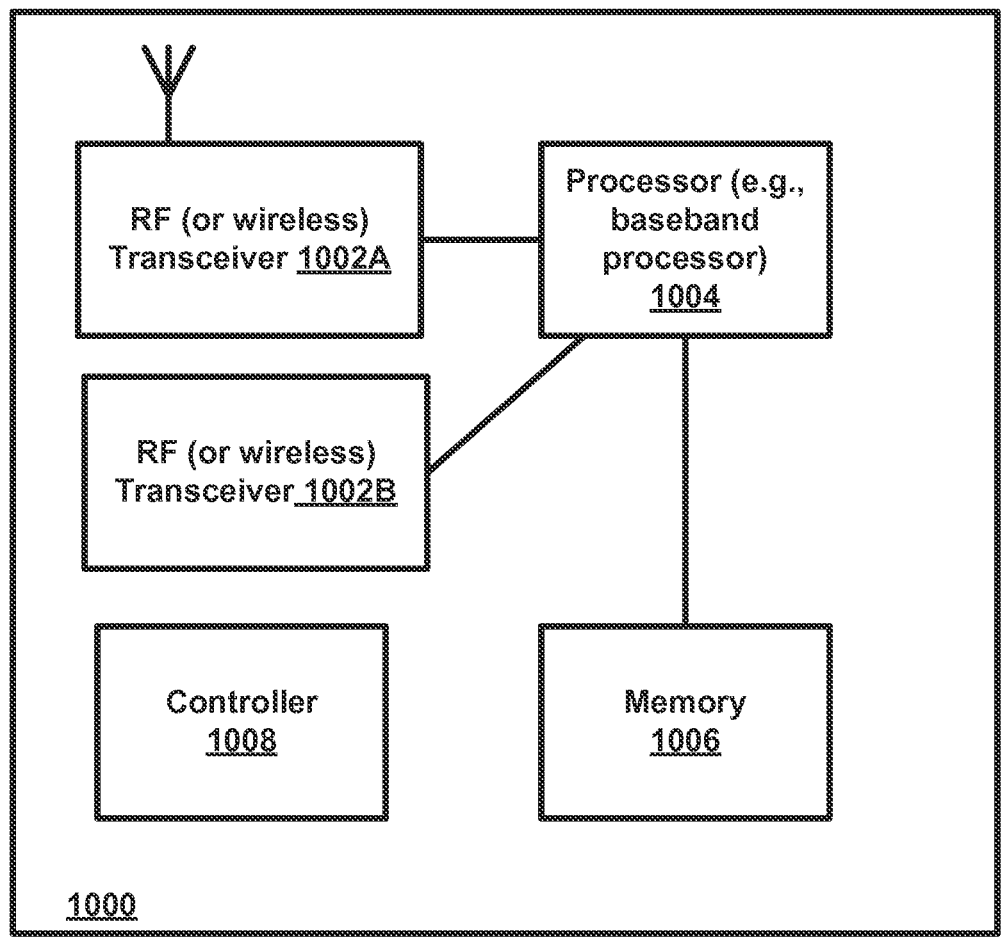
FIG. 10 is a block diagram of a wireless station (e.g., BS or user device or other wireless node) according to an example implementation.

FIG. 10 is a block diagram of a wireless station (e.g., BS or user device) 1000 according to an example implementation. The wireless station 1000 may include, for example, two RF (radio frequency) or wireless transceivers 1002A, 1002B, where each wireless transceiver includes a transmitter to transmit signals and a receiver to receive signals. The wireless station also includes a processor or control unit/entity (controller) 704 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 10, a controller (or processor) 1008 may execute software and instructions, and may provide overall control for the station 1000, and may provide control for other systems not shown in FIG. 10, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

An example of an apparatus may also include means (1004, and/or 1002A/1002B) for determining, by a user device in a wireless network, that a data unit received from a base station is out-of-order, and means (1004, and/or 1002A/1002B) for controlling sending, from the user device to the base station, an out-of-order indication to indicate that the user device has received the out-of-order data unit.

Another example of an apparatus may include means (1004, and/or 1002A/1002B) for determining, by a user device in a wireless network based on a status of a new data indicator for a hybrid ARQ process, a failure to receive an expected retransmission of a data unit from a base station for the hybrid ARQ process, and means (1004, and/or 1002A/1002B) for controlling sending a signal from the user device to the base station based on the determining. The apparatus may also include means (1004, and/or 1002A/1002B) for controlling sending, from the user device to the base station based on the determining, a retransmission failure indication for the hybrid ARQ process indicating a failure to receive an expected retransmission of a data unit from the base station for the hybrid ARQ process, and/or means (1004, and/or 1002A/1002B) for obtaining, by the user device from the base station, uplink resources, and means (1004, and/or 1002A/1002B) for controlling sending a status report from the user device to the base station via the obtained uplink resources, the status report indicating a status of acknowledgement or negative acknowledgement for one or more data units including a status of negative acknowledgement of the data unit for which a failure to receive an expected retransmission was determined.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, and/or the like) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    determining, by a first base station in a wireless network, a user device has transitioned from an active state to an idle state;
    determining, by the first base station, a list of base stations and a list of cells corresponding to the list of base stations representing a tracking area for the user device based on a signal received from at least one second base station, the signal received from the at least one second base station including an indication of an amount of activity on at least one boundary between the at least one second base station and a plurality of third base stations;
    controlling sending, from the first base station to the user device, a signal including at least one of the list of base stations and the list of cells as a tracking area for the user device;
    controlling receiving, at the first base station from a mobility management entity, a paging signal for the user device; and
    controlling sending, by the first base station to at least one base station in the list of base stations, the paging signal for the user device, wherein the at least one base station is a non-neighboring base station to the first base station.

2. The method of claim 1, further comprising:
    controlling sending, from the first base station to a mobility management entity, a signal including at least one of the list of base stations and the list of cells as a tracking area for the user device.

3. The method according to claim 1, further comprising:
    maintaining, by the first base station, a list corresponding boundary activity and base station location; and
    determining the list of base stations representing the tracking area for the user device based on the list corresponding boundary activity and base station location.

4. The method according to claim 1, further comprising:
    determining, at the first base station, at least one mobility parameter for the user device; and
    determining the list of base stations representing the tracking area for the user device is further based on the mobility parameters for the user device.

5. The method according to claim 1, further comprising:
    controlling receiving, at the first base station from a first neighboring base station of the at least one second base station, a signal including an indication of an amount of activity at the at least one second base station and a plurality of third base stations wherein the indication includes a base station boundary list that indicates activity associated with a boundary between two of the plurality of third base stations exceeds a threshold amount of activity in a period of time;
    determining if the first base station includes a boundary to one of the at least one second base station with an amount of activity that exceeds the threshold amount of activity in a period of time; and
    upon determining the first base station includes a boundary to one of the at least one second base station with an amount of activity that exceeds the threshold amount of activity in a period of time:
    adding an identification of the boundary to the base station boundary list; and
    controlling sending, by the first base station to each of the at least one second base station, the base station boundary list.

6. The method of claim 1, further comprising:
    controlling receiving, at the first base station from another base station, a paging signal for another user device; and
    at least one of:
    controlling sending, by the first base station to the another user device, the paging signal for the another user device, and
    controlling sending, by the first base station to yet another base station, the paging signal for the another user device.

7. The method of claim 1, wherein the paging signal for the user device is sent over a modified X1 application protocol.

8. The method of claim 1, wherein controlling sending the paging signal includes:
    passing the paging signal through each of the list of base stations until all base stations in the list of base stations receive the paging signal.

9. An apparatus comprising at least one processor and at least one memory including computer instructions, when executed by the at least one processor, cause the apparatus to:
    determine a user device in a wireless network has transitioned from an active state to an idle state;

determine a list of base stations and a list of cells corresponding to the list of base stations representing a tracking area for the user device based on a signal received from at least one base station, the signal received from the at least one base station including an indication of an amount of activity on at least one boundary between at the at least one second base station and a plurality of other base stations;

control sending, to the user device, a signal including at least one of the list of base stations and the list of cells as a tracking area for the user device;

control receiving, by a first base station from a mobility management entity, a paging signal for the user device; and control sending, to each base station in the list of base stations, the paging signal, wherein at least one of the base stations in the list of base stations is a non-neighboring base station to the first base station.

10. The apparatus of claim 9, wherein the computer instructions, when executed by the at least one processor, further cause the apparatus to:

control sending, to a mobility management entity, a signal including at least one of the list of base stations and the list of cells as a tracking area for the user device.

11. The apparatus according to claim 9, wherein the computer instructions, when executed by the at least one processor, further cause the apparatus to:

maintain a list corresponding boundary activity and base station location; and determine the list of base stations representing the tracking area for the user device based on the list corresponding boundary activity and base station location.

12. The apparatus according to claim 9, wherein the computer instructions, when executed by the at least one processor, further cause the apparatus to:

determine mobility parameters for the user device; and determine at least one of the list of base stations and the list of cells representing the tracking area for the user device is further based on the mobility parameters for the user device.

13. The apparatus according to claim 9, wherein the computer instructions, when executed by the at least one processor, further cause the apparatus to:

control receiving, from a first neighboring base station of the at least one base station, a signal including an indication of an amount of boundary activity at the at least one base station and a plurality of base stations wherein the indication includes a base station boundary list that indicates activity associated with a boundary between two of the plurality of base stations exceeds a threshold amount of activity in a period of time;

determining if the apparatus includes a boundary to one of the at least one base station with an amount of activity that exceeds the threshold amount of activity in a period of time; and upon determining the apparatus includes a boundary to one of the at least one second base station with an amount of activity that exceeds the threshold amount of activity in a period of time:

add an identification of the boundary to the base station boundary list; and control sending, to each of the at least one second base station, the base station boundary list.

14. The apparatus of claim 9, wherein the computer instructions, when executed by the at least one processor, further cause the apparatus to:

control receiving, from another base station, a paging signal for another user device; and at least one of:

control sending, to the another user device, the paging signal for the another user device, and controlling sending, to yet another base station, the paging signal for the another user device.

15. A method comprising:

controlling receiving, at a first base station in a wireless network from a second base station of a plurality of base stations in the wireless network, a signal including a base station boundary list having an indication of an amount of activity associated with a boundary between at least two of the plurality of base stations;

determining if the first base station includes a boundary to one of the plurality of base stations with an amount of activity that exceeds a threshold amount of activity in a period of time; and upon determining the first base station includes a boundary to one of the plurality of base stations with an amount of activity that exceeds a threshold amount of activity in a period of time:

adding an identification of the boundary to the base station boundary list; and controlling sending, by the first base station to at least one of the plurality of stations, the base station boundary list, wherein the at least one of the base stations of the plurality of base stations is a non-neighboring base station to the first base station.

16. The method of claim 15, further comprising:

determining, by the first base station, the user device has transitioned from an active state to an idle state;

determining, by the first base station, at least one of a list of base stations and a list of cells representing a tracking area for the user device based on the base station boundary list;

controlling sending, from the first base station to the user device, a signal including at least one of the list of base stations and the list of cells as a tracking area for the user device.

17. The method of claim 16, further comprising one of:

controlling sending, from the first base station to a mobility management entity, a signal indicating a release of the user device and including an identification of the first base station as an anchor base station for the user device; and controlling sending, from the first base station to the mobility management entity, a signal including at least one of the list of base stations and the list of cells as a tracking area for the user device.

18. An apparatus comprising at least one processor and at least one memory including computer instructions, when executed by the at least one processor, cause the apparatus to:

control receiving of at least one of a list of base stations and a list of cells associated with an idle user device;

store at least one of the list of base stations and the list of cells as representative of a tracking area for the idle user device;

control receiving of an event configured to trigger a paging of the idle user device; and control sending of a paging signal to each of the base stations in at least one of the list of base stations and the list of cells, the paging signal being received by each of the base stations.

19. A method of determining an updated tracking area based on an amount of user device activity across a cell boundary, the method comprising:
- controlling receiving, at a first base station in a wireless network from a second base station of a plurality of base stations in the wireless network, a signal including a cell activity boundary list including at least an indication of an amount of user device activity associated with one or more user devices transitioning across a first cell boundary between a first cell and a second cell;
- determining, by the first base station, that the amount of user device activity across the first cell boundary is greater than a threshold;
- determining, based on the determining that the amount of user device activity across the first cell boundary is greater than the threshold, an updated tracking area that includes both the first cell and the second cell in order to reduce tracking area updates; and
- sending, by the first base station, the updated tracking area to a first idle state user device.

* * * * *